Sept. 9, 1969     H. L. HOKE ET AL     3,466,069

REPAIR SLEEVE

Original Filed May 23, 1966     5 Sheets-Sheet 1

INVENTORS
HOWARD L. HOKE, DECEASED,
BY JEAN K. HOKE, EXECUTRIX
AND JAMES W. HALTERMAN.

BY James T. Anderson
ATTORNEY.

Sept. 9, 1969  H. L. HOKE ET AL  3,466,069
REPAIR SLEEVE

Original Filed May 23, 1966  5 Sheets-Sheet 2

INVENTORS
HOWARD L. HOKE, DECEASED,
BY JEAN K. HOKE, EXECUTRIX
AND JAMES W. HALTERMAN
By James E. Anderson
ATTORNEY.

Sept. 9, 1969  H. L. HOKE ET AL  3,466,069
REPAIR SLEEVE

Original Filed May 23, 1966  5 Sheets-Sheet 4

INVENTORS
HOWARD L. HOKE, DECEASED,
BY JEAN K. HOKE, EXECUTRIX
AND JAMES W. HALTERMAN.

BY James E. Gudena
ATTORNEY.

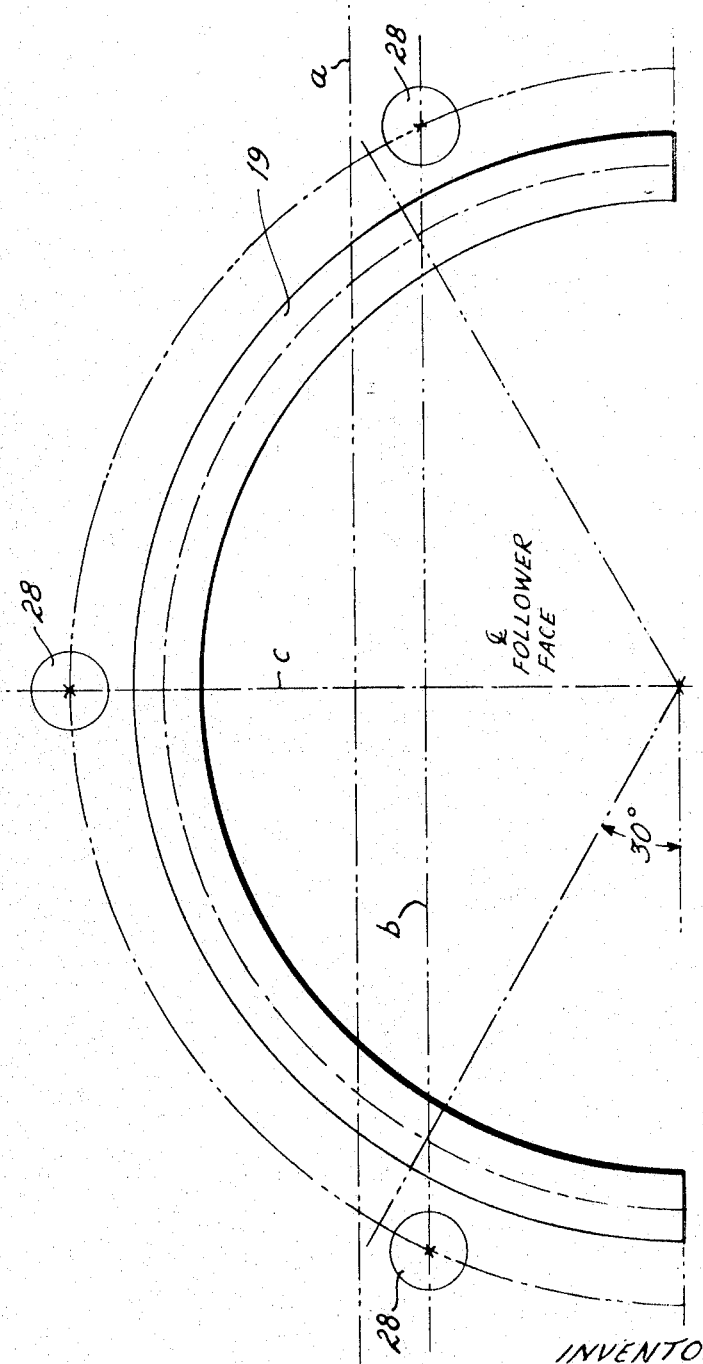

United States Patent Office 3,466,069
Patented Sept. 9, 1969

3,466,069
REPAIR SLEEVE
Howard L. Hoke, deceased, late of Bradford, Pa., by Jean K. Hoke, executrix, Bradford, Pa., and James W. Halterman, Salamanca, N.Y., assignors to Dresser Industries, Inc., Dallas County, Tex., a corporation of Delaware
Continuation of application Ser. No. 552,346, May 23, 1966. This application July 18, 1968, Ser. No. 749,249
Int. Cl. F16l 19/00, 33/18
U.S. Cl. 285—348   10 Claims

ABSTRACT OF THE DISCLOSURE

A preassembled pipe repair sleeve formed in complementary halves each having end gaskets which are axially compressible. Axially adjustable followers have an inward cammed surface for compressibly engaging the gasket non-uniformly about its extent.

---

This application is a continuation of application Ser. No. 552,346, filed May 23, 1966, now abandoned.

This invention relates to pipe repair sleeves, and more particularly resides in an improved sleeve consisting of two complementary halves which are supplied in completely assembled condition.

A sleeve of the present type typically includes a pair of matching semi-circular sleeve bodies tightened about a leaking pipe section by bolts, gaskets between the sleeve bodies, semi-circular gaskets received in recesses in these bodies, and semi-circular gasket followers tightened axially by bolts. Heretofore, in such a repair sleeve all or some of these parts have been loose, and its use has necessitated their individual handling. The gaskets encircling the pipe, for example, frequently have to be cut to an appropriate size. One disadvantage of loose parts, of course, is the possibility that they will become lost. A more critical disadvantage, however, is that it provides leeway for error in installing these parts and the use of the sleeve is not as foolproof as desired. A further problem connected with the installation of split repair sleeves is that heretofore they have inherently required that all of the follower bolts be tightened evenly. For example, a worker might neglect to tighten a hard to reach bolt beneath the pipe, thereby failing to establish a complete seal.

Accordingly, it is the principal object of this invention to provide a split repair sleeve which can be supplied in completely preassembled condition and which, due to its overall "foolproof" design, offers superior reliability, effectiveness and ease of installation in the field.

In accordance with this invention, the above objective is attained by a combination of many novel features which will be described fully hereafter. Briefly, however, particularly significant innovation resides in the provision of specially shaped followers and wedge-shaped gaskets which are initially held together in assembled relation within the sleeve bodies. The gaskets need not be cut to exact size for a given pipe size within a nominal range of sizes for which the repair sleeve is designed, nor need they be handled in any other way. These semi-circular gaskets of wedge-shaped cross-section are molded with tabs which interlock with mating openings in the followers and they are thereby prevented from falling out of the preassembled sleeve. Likewise, the side gaskets are precut and held in place. The bolt-receiving follower flanges and the bolts themselves are external to the sleeve bodies. Due to the location of the bolt holes and a variance in the axial extent of the gasket-engaging follower edges, the tightening of only the side bolts can be adequate to attain sufficient sealing pressure around the entire gasket ring. Measured from a plane normal to the pipe axis, the axial extent of the gasket-engaging follower edges is greater at the top and bottom center lines than at the parting lines at the sides, providing greater space allowance for "prepack" of the gaskets where their ends meet. The assembled followers are initially positioned by bolts, with spacers which are yieldable when the bolts are later tightened. The side bolts also are previously inserted, and are held from falling out by suitable grommets.

Further objects, advantages and details will become apparent from the following description when read in conjunction with the accompanying drawings, in which:

FIGURE 13 is a diagram illustrating the relation of the follower bolts to the center of gravity of the gasket.

Figure 1:
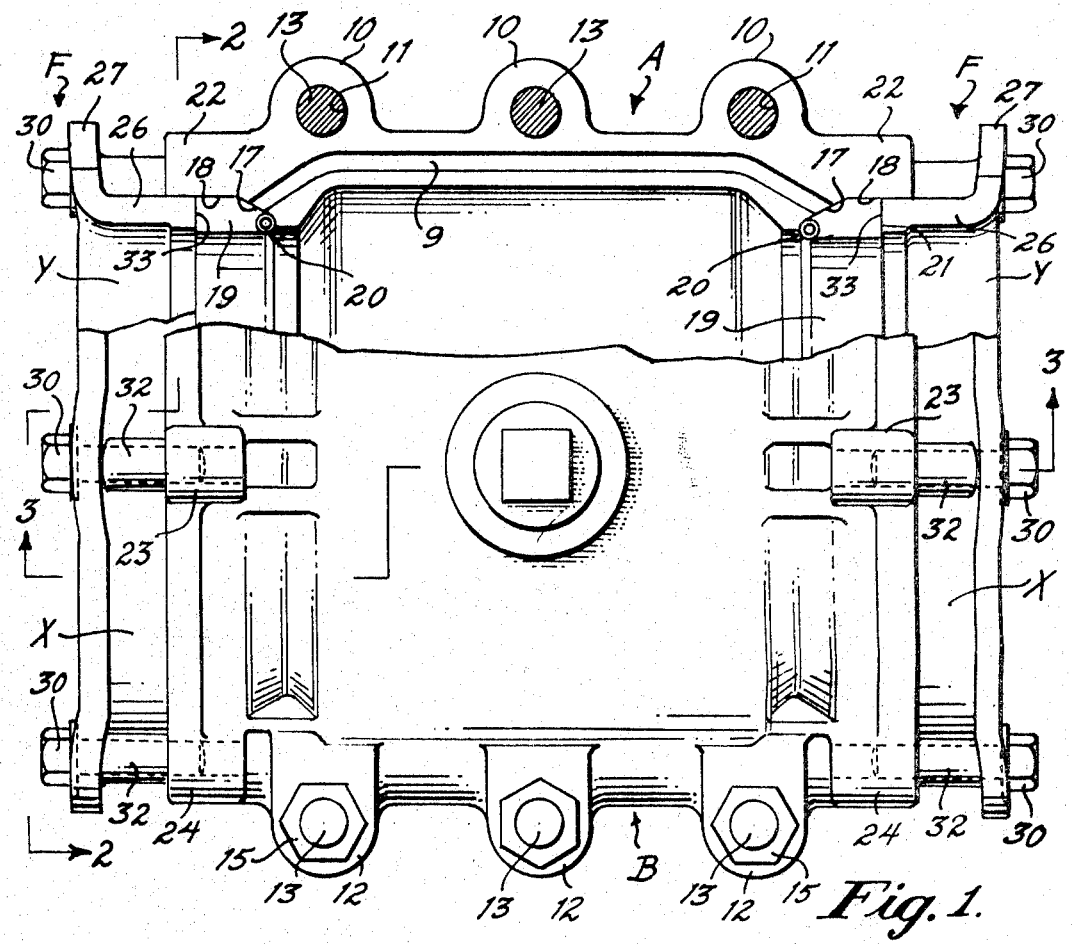
FIGURE 1 is a top plan view, partially broken away, of a repair sleeve embodying this invention, being taken as indicated by the lines 1—1 in FIGURE 2.
Figure 2:
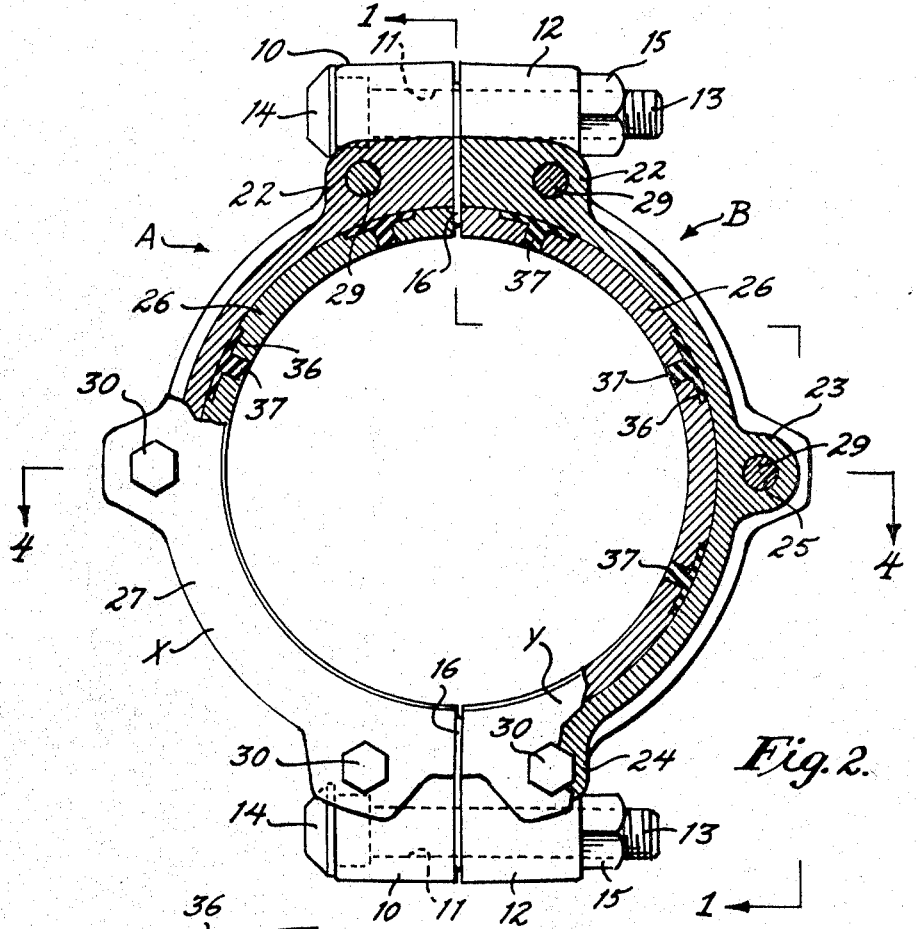
FIGURE 2 is a view taken partly in section and partly in elevation being as indicated by the lines 2—2 of FIGURE 1.
Figure 5:
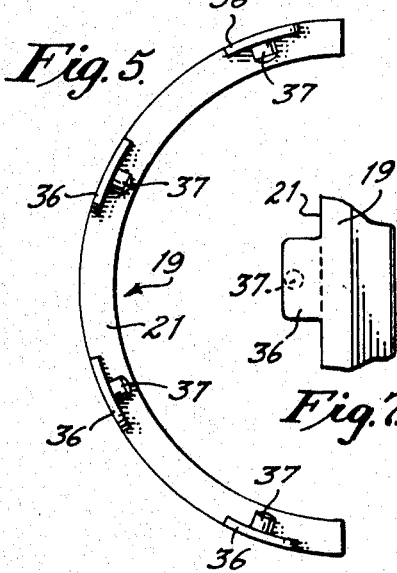
FIGURE 5 is a drawing of the outer side of a gasket half.
Figures 6, 7:
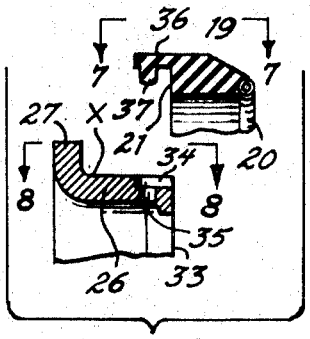
FIGURE 6 is an exploded sectional view of a follower and a gasket.
FIGURE 7 is a view of the portion of the gasket indicated by lines 7—7 in FIGURE 6.

Referring now to the drawings, and first more particularly to FIGURES 1 and 2, the repair sleeve according to this invention comprises matching halves which are generally referred to as A and B. For the purposes of this specification, the sleeve half A will be regarded as the bottom half and the sleeve B as the top half. Sleeve half A is formed with a series of bosses 10, each of which has a bolt hole 11. The top half B also is provided with a series of bosses 12 corresponding in number and arrangement to the bosses 10, and these bosses 12 have bolt holes in alignment with the bolt holes 11. Bolts 13 pass through these aligned openings, each of the bolts 13 having a head 14 at one end and carrying a nut 15 at the other. The bolts themselves are prevented from falling out of the holes 11 in the lower sleeve half, when the nuts are removed, by means of rubber grommets (not shown) slipped over their ends. Thus the ease of installing the sleeve is improved and the possibility that the bolts may be lost is not present. The nuts 15 are tightened to draw the sleeve halves A and B together, and said gaskets 16 interposed between the meeting faces within groove 9 in the sleeve halves. Gaskets 16 can, if desired, be temporarily secured to one of the sleeve halves by adhesive to insure that they will be installed properly. When assembled, the sleeve halves A and B define a complete cylindrical sleeve structure.

Spaced inwardly from each end of each sleeve half is an internal conical surface 17 which together with a bore 18 immediately adjacent thereto defines a gasket recess. Received in each of these recesses is a wedge-shaped semi-circular gasket 19 of an elastomeric material such as rubber or a suitable rubber composition. Each gasekt 19 has an inner end which may be provided with a metal coil 20, a conical surface which engages the conical surface 17, a cylindrical surface which engages the bore 18, and an end face 21 (FIGURE 4).

Figure 3:
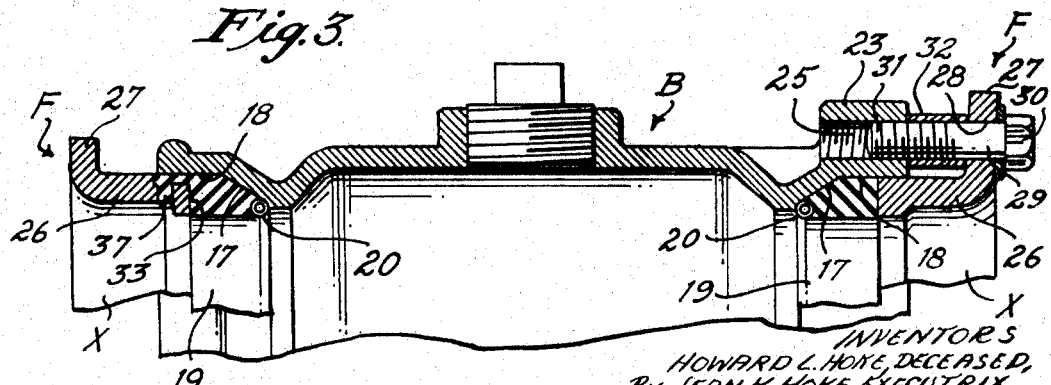
FIGURE 3 is an axial section through the sleeve taken as indicated by lines 3—3 in FIGURE 1.

Both ends of the sleeve halves A and B are formed with three bosses 22, 23 and 24, there being three of these bosses at each end of each sleeve half. The bosses 22 and 24 are located at the sides of the sleeve halves and the bosses 23 are at the vertical center-line. Each of the bosses 22, 23 and 24 has a threaded bore 25 as shown in FIGURE 3.

A partially external follower referred to in its entirety by the reference character F is mounted on each end of the sleeve and comprises two matching halves X and Y.

Figure 4:
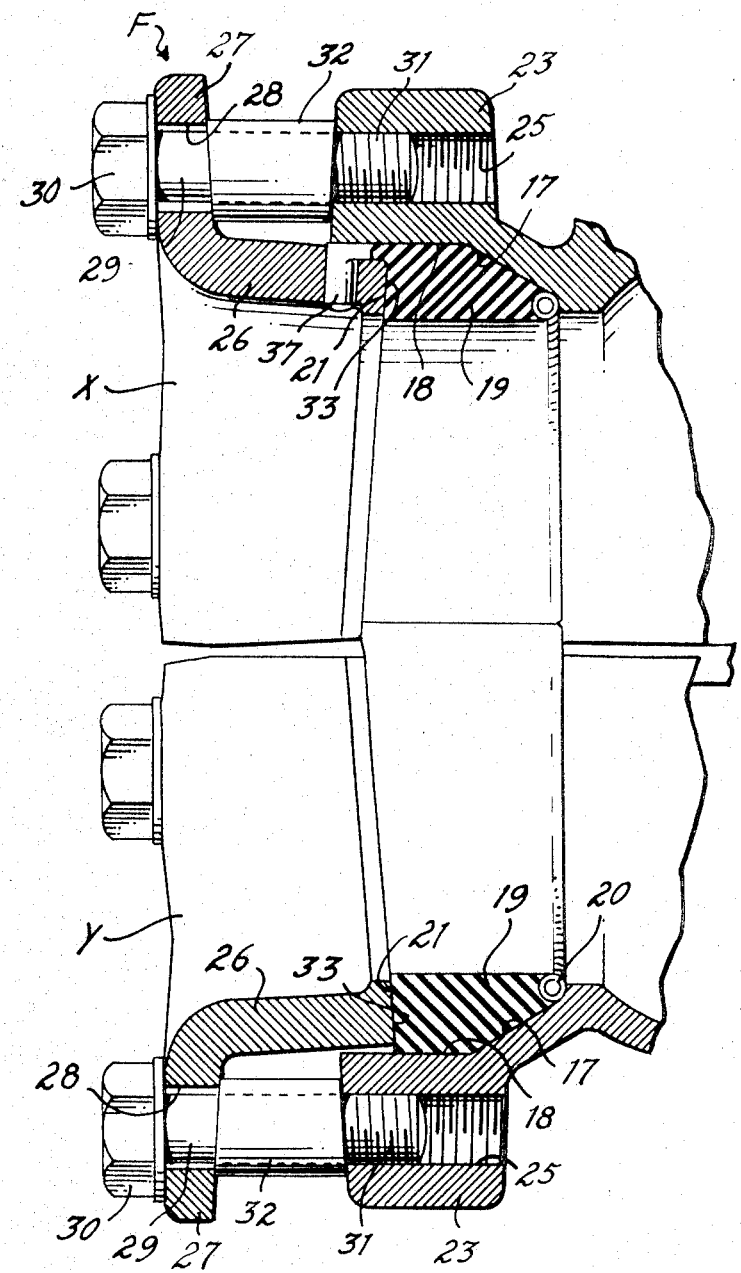
FIGURE 4 is a partial axial section at one end of the assembled sleeve, showing the variation in axial extent of each follower, and taken as indicated by lines 4—4 in FIGURE 2.

Referring now more particularly to FIGURE 4, it will be seen that each follower half X or Y comprises an axially directed main portion 26 that terminates at its outer end in a radial flange 27. Each flange 27 is formed with three bolt holes 23 located radially outwardly from the gasket and corresponding to the locations of bosses 22, 23 and 24. Bolts 29 having heads 30 and threaded shanks 31 pass through the holes 28 and are screwed into the tapped holes 25. Spacers 32 are preferably carried by bolts 29 and maintain a predetermined assembled relation prior to installation. The axial portion 26 of each follower half X or Y has an inner end 33 which engages the end 21 of a gasket 19. As can be seen in FIGURE 4, the follower edge 33 slopes inwardly in progression from the side parting lines to the vertical center lines. Taking the radial flanges 27 as representing a plane normal to the longitudinal sleeve axis, then, the axial extent or dimension measured from this plane to the follower edge 27 is greater at the vertical center line than at the side parting lines. The cross-section of the gasket 19, on the other hand, is not variable, but has a uniform width around its circle. In the preassembly of the sleeve, uniform tightening of all the bolts 29 will, therefore, exert compressive force against the top and bottom of the gasket ring while leaving sides substantially less distorted toward the parting lines. The principle of operation of this feature will be explained more fully hereafter.

Figure 8:
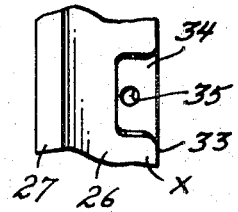
FIGURE 8 is a view of the portion of the follower indicated by lines 8—8 in FIGURE 6.

Referring now particularly to FIGURES 5–8 inclusive, the structure for providing a mechanical interlock between each follower and its associated gasket will be described. As shown in FIGURE 8 the follower half X is formed with a plurality of shallow recesses 34 extending inwardly from the end 33. Substantially in the center of each recess 34 is a hole providing a socket 35. Each gasket 19 is molded with a plurality of inwardly extending tabs 36 corresponding in number and arrangement to the recesses 34 and shaped to be snugly received therein. Each tab 36 has a radially inwardly directed stud 37 which is received in a socket 35. It will be evident that with the tabs 36 of each gasket received in the recesses 34 and the studs 37 received in the sockets 35, each follower and its respective gasket are securely interlocked.

The spacing of the bosses 22, 23 and 24 on each follower half is important because it determines the distribution of forces to the gaskets. Referring to FIGURE 13, the center of gravity (acting normal to the plane of the gasket) is represented by line $a$ and an imaginary line through the superimposed locations of the bolt holes 28 is represented at $b$. It is to be noted that the two bolt holes 28 on line $b$ are on one side of the center of gravity $a$ and the bolt hole 28 on the center line $c$ is on the opposite side; also, line $b$ is purposely located close to the center of gravity of the gasket at $a$.

The use and principles of operation of the above-described split repair sleeve will now be explained. When the sleeve is supplied to the user thereof it is completely assembled; the end bolts 30 are uniformly tightened until resistance from the spacers 32 is felt (the gaskets 19 thereby being compressed as previously mentioned), and the side bolts and nuts have been tightened only as needed to hold the two sleeve halves together. At the site where the sleeve is to be installed, the side nuts 15 are unscrewed and the top sleeve half B is lifted off the lower half A. Sleeve half A is placed beneath the section of pipe to be repaired, and half B is placed on top. The replacement and tightening of side nuts 15 has two effects. Compressive force is applied to the side gaskets 16, thereby sealing off the parting line between the sleeve halves. Also, the ends of the gaskets 19 abut each other, and as tightening increases, they are distorted into available space with the confines of their gasket recesses. It must be remembered that because of the previously described variance in the follower width, the top and bottom portions of the gaskets already have been placed under a certain amount of compression, or "prepack." The tightening of the side bolts now extends this compressive packing action to the remainder of the gasket. Following tightening of the side bolts 13, all that need be done is to tighten the end bolts 29. The spacers 32 do not obstruct such tightening, for they are yieldable and compress axially. Because of the particular follower construction, the resolution of forces is such that the tightening of only the bolts at the sides can bring about substantial and adequate compression of the gasket ring throughout its circumference. It is, of course, intended that all six of the bolts at each end should be tightened, but this is in the nature of a safeguard to make the repair sleeve "fool-proof." It will be evident that this object has been particularly achieved by virtue of the fact that all of the critical parts in each half are preassembled and preset to function properly, and none of them requires any handling in the field.

Figure 10:
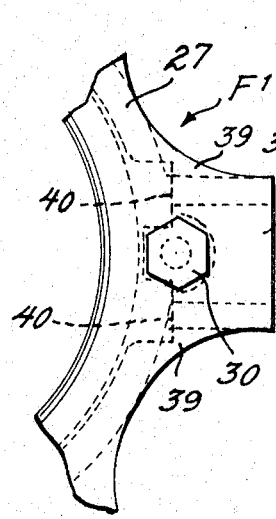
FIGURE 10 is an end view of the portion of the sleeve shown in FIGURE 9.
Figure 9:
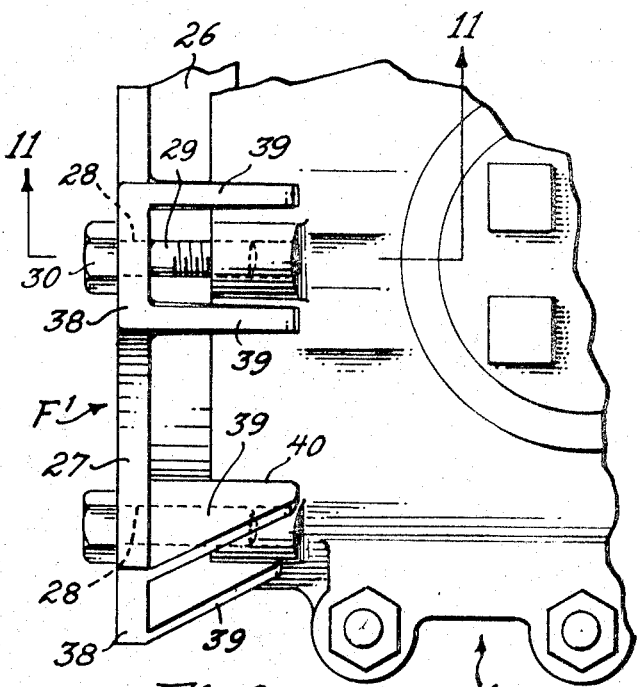
FIGURE 9 is a plan view of a portion of a modified form of coupling having web-like arms to prevent "rolling" of the follower halves.
Figure 12:
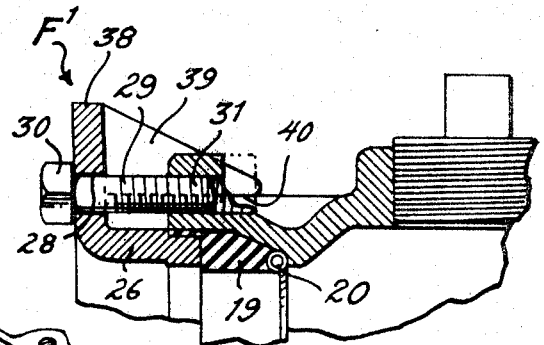
FIGURE 12 is an isometric view looking at the inside of a pre-assembled sleeve half.
Figure 11:
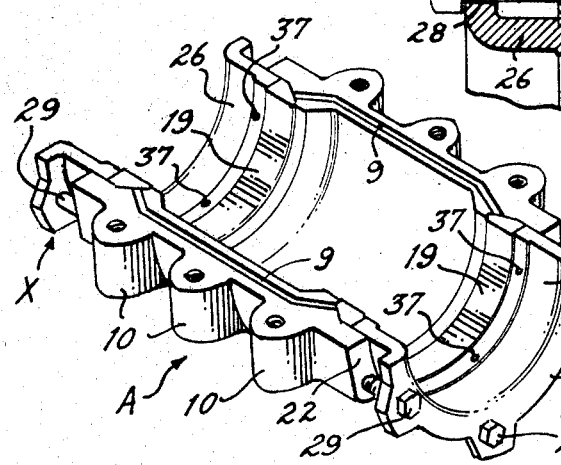
FIGURE 11 is a cross-section taken as indicated by the lines 11—11 in FIGURE 9.

A modified embodiment of this invention to be described with reference to FIGURES 9, 10 and 11 should be employed in the larger size sleeves. The follower $F^1$ is shown as having the usual outer flange 27 which is enlarged about each bolt hole 28. These enlarged portions are designated 38 and extend axially inwardly from the portion 27. On opposite sides of the bolt hole 28 formed therein is a pair of web-like arms 39 of generally triangular formation, between which a bolt 29 passes. Each arm 39 has a radially inward bearing surface 40 which engages the outer surface of the respective sleeve half. These arms 40 counteract any tendency of the follower half to tilt inwardly as the bolts 29 are tightened.

Although for most pipe sizes it is sufficient to provide only three bosses with corresponding bolts and bolt holes for each follower half, it may be desirable to use four or more bolts per follower half for use in connection with larger pipe sizes such as those of eight inches or more in diameter. When using four boss-bolt hole-bolt combinations per follower half, two such combinations should be placed below and close to center of gravity line $a$ of FIGURE 13 while the other two should be placed above line $a$ on opposite sides of center line $c$ and spaced equally therefrom. Should it be necessary to use five boss-bolt hole-bolt combinations per follower half for even larger pipe sizes, the fifth combination would be placed on center line $c$.

What is claimed is:

1. A pipe sleeve comprising a pair of mating semi-circular sleeve bodies adapted to encircle a pipe, means for drawing said bodies together about the pipe at their parting lines, sealing means at said parting lines, each end of each said body defining a gasket recess, gaskets confined within said recesses to encircle a contained pipe, gasket follower means forming a semi-circular extent at each body end independent of the gasket follower means at the mating end on the other sleeve body, each of said follower means having an axially directed portion to abut against a gasket within its recess, either of each associated gasket and follower having its abuttable end face axially canted to effect gradually changing divergence relative to a plane normal to its own axis at least at the exterior circumference thereof, and means for tightening said follower means inwardly against the gaskets whereby cold flow of the gaskets effect sealing against contained pipe.

2. A pipe sleeve comprising a pair of mating semi-circular sleeve bodies adapted to encircle a pipe, means for drawing said bidies together about the pipe at their parting lines, sealing means at said parting lines, each end of each said body defining a gasket recess, gaskets confined within said recesses to encircle a contained pipe, gasket follower means forming a semi-circular extent at each body end and tightenable toward the body independent of the gasket follower means at the mating end on the other sleeve body, each of said follower means having an axially directed portion to act against a gasket within its recess, said follower portion having a gasket engaging end surface axially canted axially inwardly of said sleeve bodies relative to a plane normal to the sleeve axis and being gradually variable from a smaller axial dimension at said side parting lines to a larger axial dimension at the vertical center line of the sleeve, and means for tightening said follower means inwardly against the gaskets whereby cold flow of the gaskets effect sealing against contained pipe.

3. A sleeve according to claim 2, wherein a sleeve body, its followers and gaskets comprise a preassembled unit, and including means interlocking each said gasket with its associated follower.

4. A pipe repair sleeve comprising a pair of mating semi-circular sleeve bodies adapted to encircle a pipe, means for drawing said bodies together about contained pipe at their parting lines, a gasket extending between the sleeve bodies, each end of each said bodies defining a gesket recess, a semi-circular gasket confined within each said recess, the ends of the two gaskets at each mating end of the mating sleeve being in abutting relation, a pair of semi-circular followers entering said recesses to act against said gaskets at each end of the sleeve, each of said followers being tightenable toward the body independent of the follower at the mating end on the other sleeve body and having a semi-circular axially directed flange for engaging its associated gasket within the recess, said last recited flange being formed with an end face axially canted axially inwardly of said sleeve bodies relative to a plane normal to the follower axis to effect gradually changing divergence at least at the exterior circumference thereof relatively to the plane of the undisturbed engageable gasket surface thereat, and a radially directed flange on each follower outside the recess and having bolt holes therein, and bolts to act against said radially directed flanges and threaded into the sleeve bodies to tighten the followers inwardly against the gaskets whereby cold flow of the gaskets effect sealing against contained pipe.

5. A sleeve according to claim 4, including spacers initially maintaining a predetermined spacing between each said radially directed follower flange and its adjacent sleeve body.

6. A sleeve according to claim 5, wherein said spacers comprise axially compressible sleeves on said bolts.

7. A sleeve according to claim 4, including tab means mechanically interlocking each gasket with its associated follower.

8. A sleeve according to claim 4, wherein the axial extent of said axially directed flange is greater at the vertical center line of the sleeve than at the sides of the sleeve.

9. A pipe sleeve according to claim 4, wherein there are three bolts for each follower, two of said bolts being located at the ends of the gasket and closely adjacent the center of gravity of its associated gasket and the third bolt being at the opposite side of the center of gravity on the vertical center line of the sleeve.

10. A pipe sleeve according to claim 4, wherein there are at least three bolts for each follower, two of said bolts being located at the ends of the gasket and closely adjacent the center of gravity of its associated gasket and another bolt being at the opposite sides of the center of gravity.

References Cited

UNITED STATES PATENTS

| | | | |
|---|---|---|---|
| 619,978 | 2/1899 | Molk | 285—379 |
| 1,165,388 | 12/1915 | Clark | 285—373 |
| 1,339,209 | 5/1920 | Livensparger | 138—97 |
| 1,474,437 | 11/1923 | McWane | 285—374 |
| 1,984,806 | 12/1934 | Pfefferle. | |
| 2,131,509 | 9/1938 | Goepel | 285—379 |
| 2,775,469 | 12/1956 | Brown | 285—373 |

CARL W. TOMLIN, Primary Examiner

DAVE W. AROLA, Assistant Examiner

U.S. Cl. X.R.

138—97; 285—373, 379